Patented Aug. 14, 1945

2,382,142

UNITED STATES PATENT OFFICE 2,382,142

PROCESS FOR RECOVERING SUBSTANTIALLY PURE m-CRESOL OR p-CRESOL

Karl Henry Engel, Teaneck, N. J., assignor to Allied Chemical & Dye Corporation, New York, N. Y., a corporation of New York No Drawing. Application November 15, 1943, Serial No. 510,399

11 Claims. (Cl. 260—621)

This invention relates to a process for purifying m-cresol or p-cresol.

As is well known, cresols are obtained in large quantities in the fractionation of coal tar. However, cresols thus obtained are not recovered in pure form but in the form of mixtures of the isomeric cresols; while substantially pure o-cresol may be separated from m-cresol and p-cresol by a simple fractional distillation, the boiling points of m-cresol and p-cresol are such that recovery of these compounds in substantially pure form by fractionation is impractical.

However, there has been an increasing demand for both m-cresol and p-cresol in substantially pure condition. To meet this demand various procedures have been proposed for obtaining substantially pure m-cresol and p-cresol from crude mixtures thereof obtained from coal tar involving forming a separable addition compound of one of the cresols and then separating the addition compound from the isomeric cresol. However, it is evident procedures for recovering such cresols involving reacting one of the cresols in the cresol mixture with another ingredient generally add to the ultimate cost of the products obtained and, for economic operation, require recovery of the ingredient employed in forming the addition compound.

Attempts have been made to recover m-cresol and p-cresol in substantially pure form by crystallization of one of the cresols from a solution of impure mixtures thereof. As yet, however, no solvent has been found which effects a clean-cut separation of these isomers, with the result that this procedure, which inherently is simpler than the method above outlined, has not been developed to any practical extent.

It is an object of this invention to provide an improved method for the purification of m-cresol and p-cresol.

I have found substantially pure m-cresol or p-cresol may be obtained by subjecting an impure m-cresol or p-cresol containing an amount of the desired cresol in excess of the proportion present in the m-cresol-p-cresol eutectic mixture in which the desired cresol predominates to the solvent action of a paraffinic hydrocarbon solvent containing not more than 5% by weight of aromatics and not more than 10% by weight of olefins, the boiling range of which is between 60° and 350° C. and preferably differs by at least 30° C. from the boiling points of m-cresol and p-cresol, separating the solution formed and recovering a residue containing the purified cresol. The process of my invention may be carried out by dissolving the impure cresol in the paraffinic solvent and cooling, whereby the desired cresol separates in highly pure condition, or by agitating the impure cresol in solid state with the paraffinic hydrocarbon solvent whereby a residue is recovered consisting of the desired cresol in substantially pure form. My invention is particularly applicable to the purification of p-cresol containing m-cresol as an impurity; however, the process of my invention is also applicable to the purification of m-cresol containing p-cresol impurities, although the percentage yields of m-cresol are not as high as are obtained with p-cresol due to the greater difficulty in removing adhering solvent from the m-cresol crystals. By operating in accordance with my invention substantially pure m-cresol and p-cresol may be obtained in a simple and economical manner; thus, I have succeeded by this method in producing m-cresol products having melting points of 12.2° C., which, so far as I am aware, is the highest melting point thus far recorded for m-cresol, and p-cresol products having melting points of 34.8° C.

The impure cresols which may be treated in accordance with my invention should contain an amount of the desired cresol in excess of the proportion present in the m-cresol-p-cresol eutectic mixture in which the desired cresol predominates, i. e. in excess of 89% by weight of m-cresol, if m-cresol is to be purified, or in excess of 58% by weight of p-cresol, if purification of this cresol is contemplated. Thus, for example, impure m-cresols containing between about 2% and about 7% by weight p-cresol or impure p-cresols containing between about 2% and about 30% by weight m-cresol such as are obtained by various refining methods from crude m- and p-cresols of coal-tar origin, may advantageously be processed.

The solvent employed in accordance with this invention may be any paraffinic hydrocarbon solvent containing not more than 5% by weight of aromatics and not more than 10% by weight of olefins, the boiling range of which is between 60° and 350° C. and preferably differs by at least 30° C. from the boiling point of m-cresol or p-cresol. The term "paraffinic hydrocarbon" is used throughout the specification and claims to include cycloparaffins, such as cyclohexane or the naphthenes, as well as straight-chain paraffins. Thus, the following paraffinic hydrocarbon solvents all of which contain not more than 5% by weight of aromatics and not more than 10% by weight of olefins are examples of solvents which may be used: A solvent having a boiling range of from 90° to 130° C. and sold under the trade name of "Lactol"; a solvent having a boiling range of 120° to 150° C. and sold under the trade name "Kemsolene"; a solvent having a boiling range between about 250° and 350° C. and sold under the trade name of "Varsol"; and the higher boiling kerosene fractions.

In carrying out the process of my invention I prefer to dissolve the impure cresol to be treated in the paraffinic hydrocarbon solvent to be employed and then cool the solution to effect crystallization of the desired cresol in substantially pure condition. The amount of solvent employed may vary widely depending on the cresol to be purified and the boiling range of the solvent; purification of p-cresol generally requires less solvent than does m-cresol due to the greater ease of separating adherent impurities from the large p-cresol crystals; furthermore, solvents having boiling ranges in the upper portion of the 60° to 350° C. range have less solvent power for cresols than the lower boiling solvents, so that larger amounts thereof must be used than when lower boiling solvents are employed. Preferably an amount of solvent between about 10% and about 50% of the weight of the cresol mixture is utilized. The impure cresol is preferably dissolved in the solvent at a temperature within the range of about 20° to 40° C. and the mixture subsequently cooled to between about 0° and about 10° C. in case p-cresol is to be crystallized, or to between about −5° and about +5° C. for crystallization of m-cresol. After separation of the substantially pure cresol crystals the solution may be distilled to recover the solvent therefrom for re-use and to obtain a cresol mixture suitable for a wide variety of uses known to the art. If necessary, the substantially pure cresol product obtained may again be crystallized from the paraffinic hydrocarbon solvent in order to effect further purification.

My invention may also be carried out by agitating the impure cresol with an amount of the paraffinic hydrocarbon solvent insufficient to completely dissolve the cresol, e. g. an amount equivalent to between about 10% and about 50% of the weight of the impure cresol, at a temperature between about −5° and about +5° C., and then permitting the slurry to separate, whereby a residue consisting of the desired cresol in substantially pure form is recovered.

The following examples are illustrative of my invention. Amounts are given in parts by weight.

*Example 1*

300 parts of a cresol mixture containing 85% p-cresol, the remainder of the mixture being chiefly m-cresol with a small percentage of mixed xylenols, were dissolved in 70 parts of a paraffinic hydrocarbon solvent, having a boiling range of 90° to 130° C. and a specific gravity of 0.728 at 25° C., at a temperature between 35° and 40° C. The solution was cooled to 0° C. and agitated at this temperature for twelve hours. The p-cresol crystals which formed were separated by filtration and washed with small amounts of the paraffinic hydrocarbon solvent at a temperature of about 0° C.; the washed product was then dried by distilling off the solvent. A p-cresol product was obtained having a melting point of 33.8° C., which corresponds to a purity of 98.6%.

*Example 2*

100 parts of a commercial p-cresol product melting at 33.5° C., which corresponds to a purity of 98%, were dissolved in 300 parts by weight of the paraffinic hydrocarbon solvent employed in Example 1 and the mixture then cooled to 0° C. The p-cresol crystals were removed by filtration and washed with cold solvent, the washed crystals then being freed from adhering solvent by distilling off the solvent. A p-cresol product was obtained, the melting point of which was 34.8° C.

*Example 3*

800 parts of a good grade of commercial m-cresol having a melting point of 11° C. were dissolved in 250 parts of the paraffinic solvent employed in Example 1 and the solution cooled to 3° to 4° C. m-Cresol crystals which separated on standing were removed by filtration and washed with small amounts of the paraffinic solvent at 3° to 4° C.; the washed crystals were then dried by distilling off the solvent. The m-cresol product obtained had a melting point of 12.2° C. which is higher than the 12° C. melting point previously reported in the literature.

It will be evident from the above description that the process of my invention provides an extremely simple and economical process for the production of m-cresol and p-cresol in substantially pure condition.

Since certain changes may be made in carrying out the above process without departing from the scope of the invention, it is intended that all matter contained in the above description shall be interpreted as illustrative and not in a limiting sense.

I claim:

1. A process for recovering in substantially pure form a compound selected from the group consisting of m-cresol and p-cresol from mixtures thereof, which comprises subjecting the mixture to the solvent action of a paraffinic hydrocarbon solvent containing not more than 5% by weight of aromatics and not more than 10% by weight of olefins, the boiling range of which is between about 60° and about 350° C., and recovering in solid condition the desired cresol in substantially pure form.

2. A process for recovering in substantially pure form a compound selected from the group consisting of m-cresol and p-cresol from mixtures thereof containing an amount of the desired cresol in excess of the proportion present in the m-cresol-p-cresol eutectic mixture in which the desired cresol predominates, which comprises dissolving the mixture in a paraffinic hydrocarbon solvent containing not more than 5% by weight of aromatics and not more than 10% by weight of olefins, the boiling range of which is between about 60° and about 350° C. and differs by at least 30° C. from the boiling points on m-cresol and p-cresol, and cooling the solution to effect crystallization of the desired cresol in substantially pure form.

3. A process for recovering in substantially pure form a compound selected from the group consisting of m-cresol and p-cresol from mixtures thereof containing an amount of the desired cresol in excess of the proportion present in the m-cresol-p-cresol eutectic mixture in which the desired cresol predominates, which comprises agitating the mixtures in solid state with a paraffinic hydrocarbon solvent containing not more than 5% by weight of aromatics and not more than 10% by weight of olefins, the boiling range of which is between about 60° and about 350° C. and differs by at least 30° C. from the boiling points of m-cresol and p-cresol, and recovering as residue the desired cresol in substantially pure form.

4. A process for recovering substantially pure p-cresol from mixtures thereof containing m-cresol, the amount of p-cresol present in the mixture being in excess of about 58% by weight, which comprises dissolving the mixture in a paraffinic hydrocarbon solvent containing less than 5% aromatics and less than 10% olefins, the boiling range of which is between about 60° and about 350° C. and differs by at least 30° C. from the boiling points of m-cresol and p-cresol, cooling the solution to effect crystallization of substantially pure p-cresol, and recovering the p-cresol crystals.

5. A process for recovering substantially pure m-cresol from mixtures thereof containing p-cresol, the amount of m-cresol present in the mixture being in excess of about 89% by weight, which comprises dissolving the mixture in a paraffinic hydrocarbon solvent containing less than 5% aromatics and less than 10% olefins, the boiling range of which is between about 60° and about 350° C. and differs by at least 30° C. from the boiling points of p-cresol and m-cresol, cooling the solution to effect crystallization of substantially pure m-cresol and recovering the m-cresol crystals.

6. A process for recovering substantially pure p-cresol from mixtures thereof containing m-cresol, the amount of p-cresol present in the mixture being in excess of about 58% by weight, which comprises agitating the mixture in solid state with a paraffinic hydrocarbon solvent containing less than 5% aromatics and less than 10% olefins, the boiling range of which is between about 60° and about 350° C. and differs by at least 30° C. from the boiling points of m-cresol and p-cresol, permitting the slurry to settle, and recovering substantially pure p-cresol as a residue.

7. A process for recovering substantially pure m-cresol from mixtures thereof containing p-cresol, the amount of m-cresol present in the mixture being in excess of about 89% by weight, which comprises agitating the mixture with a paraffinic hydrocarbon solvent containing less than 5% aromatics and less than 10% olefins, the boiling range of which is between about 60° and about 350° C. and differs by at least 30° C. from the boiling points of p-cresol and m-cresol, permitting the slurry to settle, and recovering substantially pure m-cresol as a residue.

8. A process for recovering substantially pure p-cresol from mixtures thereof containing m-cresol, the amount of p-cresol present in the mixture being in excess of about 58% by weight, which comprises dissolving the mixture in a paraffinic hydrocarbon solvent containing less than 5% aromatics and less than 10% olefins, the boiling range of which is between about 90° and about 130° C., at a temperature between about 20° and about 40° C., cooling the solution to between about 0° and about 10° C., and recovering substantially pure crystals of p-cresol.

9. A process for recovering substantially pure m-cresol from mixtures thereof containing p-cresol, the amount of m-cresol present in the mixture being in excess of about 89% by weight, which comprises dissolving the mixture in a paraffinic hydrocarbon solvent containing less than 5% aromatics and less than 10% olefins, the boiling range of which is between about 90° and about 130° C., at a temperature between about 20° and about 40° C., cooling the solution to between about −5° and about +5° C., and recovering substantially pure crystals of m-cresol.

10. A process for recovering substantially pure p-cresol from mixtures thereof with m-cresol, the amount of p-cresol present in the mixture being in excess of about 58% by weight, which comprises agitating the mixture with between about 10% and about 50%, by weight of the cresol, of a paraffinic hydrocarbon solvent containing less than 5% aromatics and less than 10% olefins, the boiling range of which is between about 90° and about 130° C., at a temperature between about −5° and about +5° C., permitting the slurry to settle, and recovering as residue substantially pure p-cresol.

11. A process for recovering substantially pure m-cresol from mixtures thereof with p-cresol, the amount of m-cresol present in the mixture being in excess of about 89% by weight, which comprises agitating the mixture with between about 10% and about 50%, by weight of the cresol, of a paraffinic hydrocarbon solvent containing less than 5% aromatics and less than 10% olefins, the boiling range of which is between about 90° and about 130° C., at a temperature between about −5° and about +5° C., permitting the slurry to settle, and recovering as residue substantially pure m-cresol.

KARL HENRY ENGEL.